(12) United States Patent
Kawamoto et al.

(10) Patent No.: US 11,136,432 B2
(45) Date of Patent: *Oct. 5, 2021

(54) METHOD FOR PRODUCING POLYISOTHIANAPHTHENE-BASED ELECTROCONDUCTIVE POLYMER

(71) Applicant: SHOWA DENKO K.K., Tokyo (JP)

(72) Inventors: Takeshi Kawamoto, Tokyo (JP); Yuka Niimi, Tokyo (JP)

(73) Assignee: SHOWA DENKO K.K., Tokyo (JP)

(*) Notice: Subject to any disclaimer, the term of this patent is extended or adjusted under 35 U.S.C. 154(b) by 161 days.

This patent is subject to a terminal disclaimer.

(21) Appl. No.: 16/474,394

(22) PCT Filed: Sep. 29, 2017

(86) PCT No.: PCT/JP2017/035429
§ 371 (c)(1),
(2) Date: Jun. 27, 2019

(87) PCT Pub. No.: WO2018/123177
PCT Pub. Date: Jul. 5, 2018

(65) Prior Publication Data
US 2019/0345287 A1 Nov. 14, 2019

(30) Foreign Application Priority Data
Dec. 28, 2016 (JP) .............................. JP2016-254977

(51) Int. Cl.
*C08G 61/12* (2006.01)
*H01B 1/12* (2006.01)
(52) U.S. Cl.
CPC ............. *C08G 61/126* (2013.01); *H01B 1/12* (2013.01); *C08G 2261/124* (2013.01);
(Continued)

(58) Field of Classification Search
CPC ................ C07D 333/72; C08G 61/126; C08G 2261/228; C08G 2261/3243; C08G 2261/51
See application file for complete search history.

(56) References Cited

U.S. PATENT DOCUMENTS 4,640,748 A 2/1987 Wudl et al.
5,648,453 A 7/1997 Saida et al.
(Continued)

FOREIGN PATENT DOCUMENTS

CN 1023527 C 1/1994
EP 0 164 974 A2 12/1985
(Continued)

OTHER PUBLICATIONS

Communication dated Aug. 6, 2020, from the European Patent Office in corresponding application No. 17886921.0.
(Continued)

*Primary Examiner* — Shane Fang
(74) *Attorney, Agent, or Firm* — Sughrue Mion, PLLC

(57) ABSTRACT

The present invention relates to (i) a method of producing a conductive polymer, comprising polymerizing at least one of compounds (A1) represented by the formula (1) disclosed in the specification in the presence of a compound (B) having sulfo group; (ii) a method of producing a conductive polymer, comprising polymerizing at least one compound selected from a group consisting of at least one compound (A2) represented by the formula (2); and (iii) a method of producing a conductive polymer, comprising copolymerizing at least one compound (A1) and at least one compound selected from a group consisting of at least one compound (A2). The method of the present invention is a method for producing a one-liquid type conductive polymer in which it is possible to easily adjust the solvent affinity, the solubility, (Continued)

and other such aspects of performance according to the purpose.

12 Claims, 2 Drawing Sheets

(52) U.S. Cl.
CPC . *C08G 2261/148* (2013.01); *C08G 2261/312* (2013.01); *C08G 2261/334* (2013.01)

(56) References Cited

U.S. PATENT DOCUMENTS

| | | | |
|---|---|---|---|
| 5,688,873 | A | 11/1997 | Saida et al. |
| 6,614,063 | B2 | 9/2003 | Hayashi et al. |
| 8,027,151 | B2 | 9/2011 | Kikuchi et al. |
| 8,721,928 | B2 | 5/2014 | Jonas et al. |
| 2005/0030703 | A1* | 2/2005 | Konuma ............ H01G 9/025 361/524 |
| 2012/0104308 | A1 | 5/2012 | Okamoto et al. |

FOREIGN PATENT DOCUMENTS

| | | |
|---|---|---|
| EP | 1 988 556 A2 | 11/2008 |
| JP | 61-017581 A | 1/1986 |
| JP | 61-254620 A | 11/1986 |
| JP | 2-252727 A | 10/1990 |
| JP | 06-049183 A | 2/1994 |
| JP | 08-259673 A | 10/1996 |
| JP | 10-120769 A | 5/1998 |
| JP | 10-140141 A | 5/1998 |
| JP | 2002-158144 A | 5/2002 |
| JP | 2003-261654 A | 9/2003 |
| JP | 2005-158882 A | 6/2005 |
| JP | 2008-214401 A | 9/2008 |
| JP | 2009-130018 A | 6/2009 |
| JP | 2011-510141 A | 3/2011 |
| JP | 2013-539806 A | 10/2013 |
| JP | 2015-021100 A | 2/2015 |
| JP | 2015-117367 A | 6/2015 |
| WO | 2011/004833 A1 | 1/2011 |
| WO | 2012/048823 A1 | 4/2012 |

OTHER PUBLICATIONS

D. Hoogmartens I., et al."A $^{13}$C CP/MAS NMR Investigation of Poly(Isothianaphthene)", Synthetic Metals, 1991, pp. 513-517, vol. 41-43, No. 1-2.

D. Hoogmartens I.,et al. "Novel chemical syntheses of poly(isothianaphthene)", Synthetic Metals, Short Communication, 1992, pp. 367-371, vol. 47, No. 3.

C. O. Sánchez, et al., "Oligo(benzo[c] thiophene-2-oxide) a poly(isothianaphthene) derivative with good photovoltaic properties", Synthetic Metals, 2011, pp. 2335-2338, vol. 161, No. 21-22.

International Search Report for PCT/JP2017/035429 dated Dec. 12, 2017 [PCT/ISA/210].

Office Action dated Jun. 29, 2021 by the Japanese Patent Office In corresponding Japanese Application No. 2018-558822.

* cited by examiner

[FIG. 1]
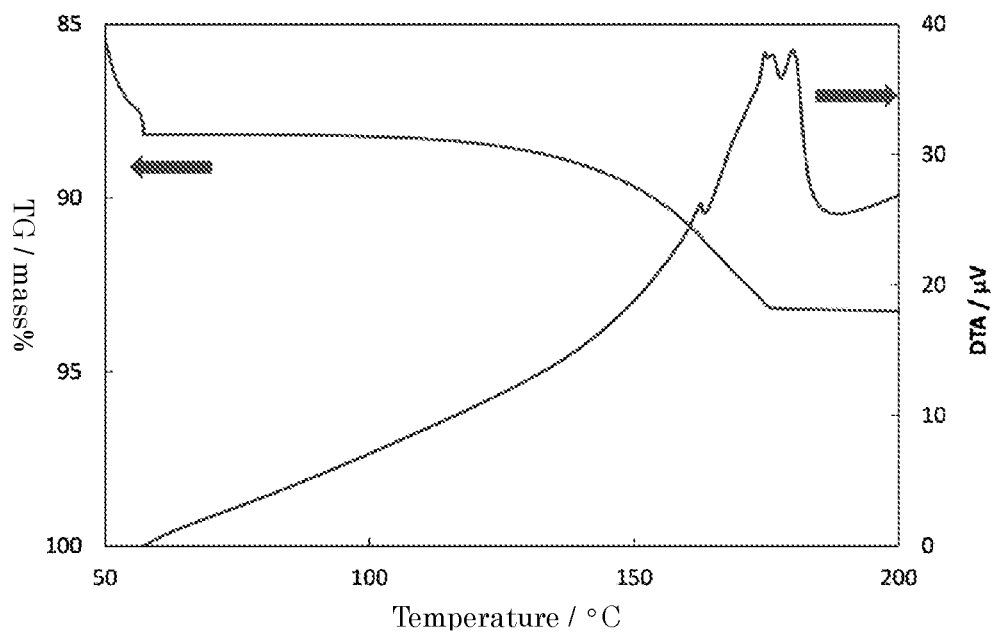
[FIG. 2]
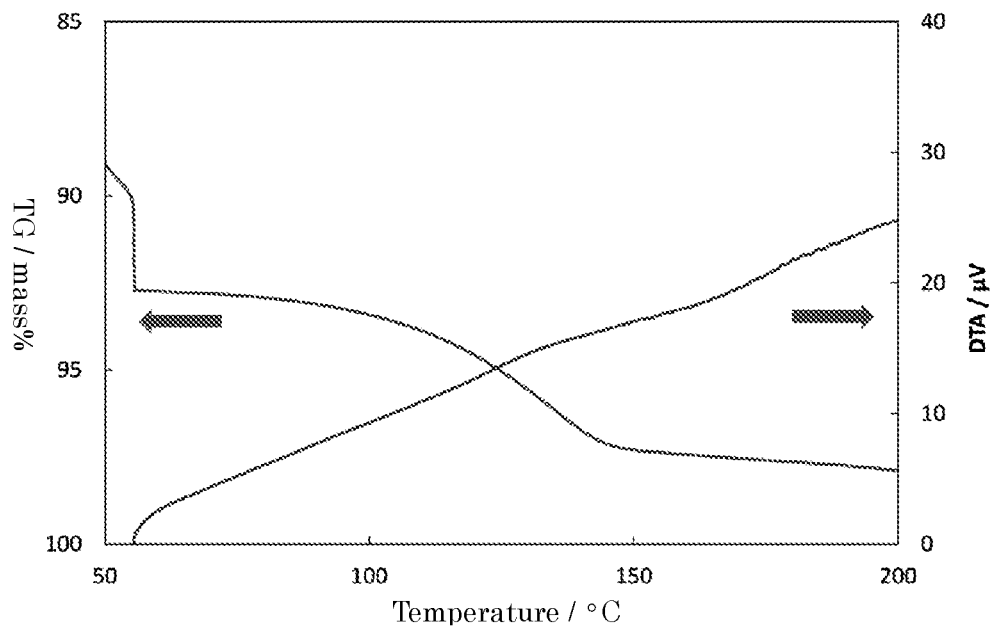

[FIG. 3]
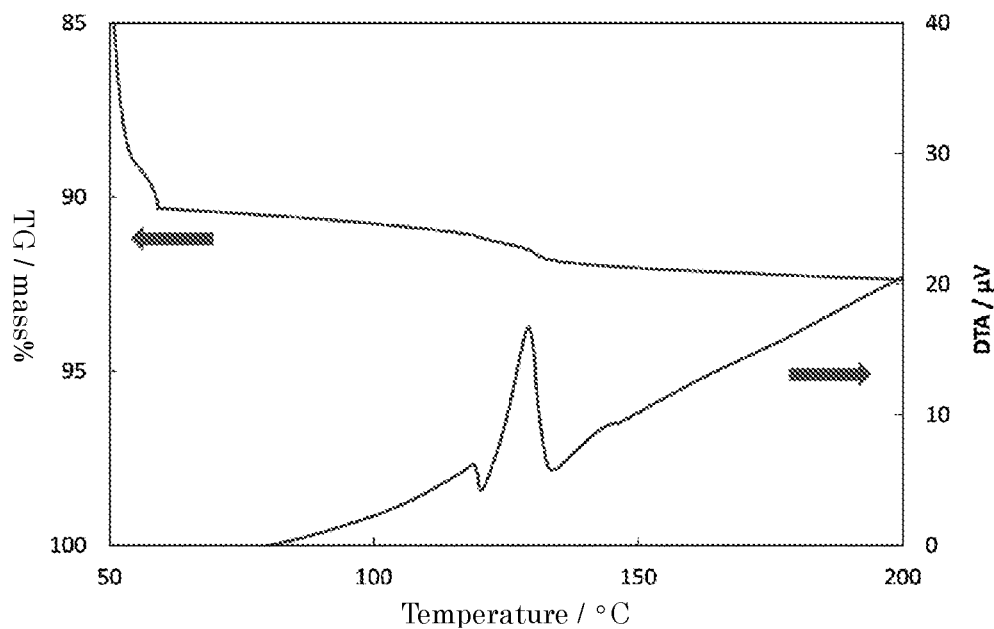
[FIG. 4]
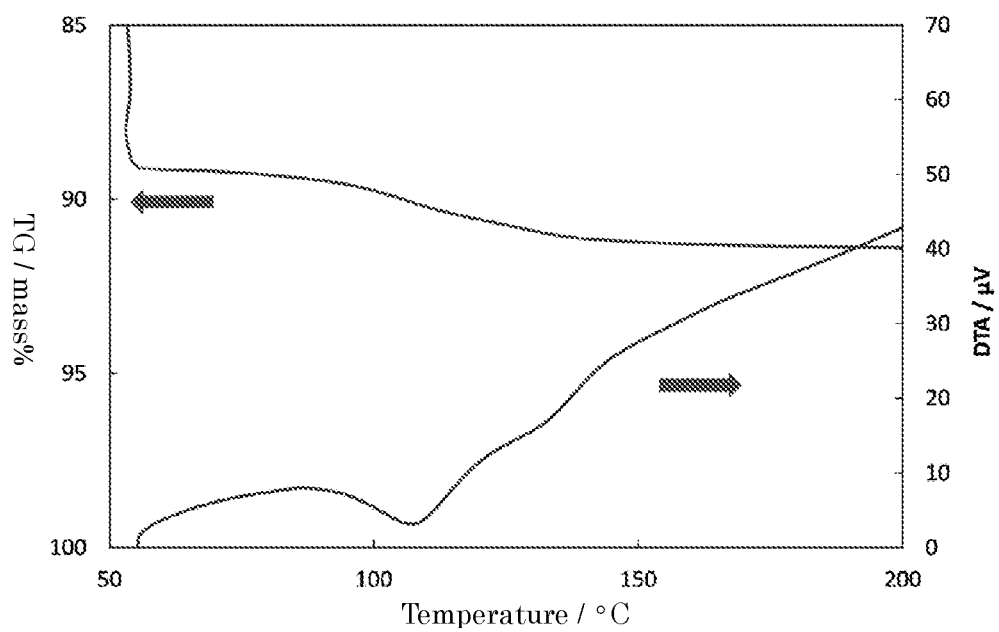

METHOD FOR PRODUCING POLYISOTHIANAPHTHENE-BASED ELECTROCONDUCTIVE POLYMER

CROSS REFERENCE TO RELATED APPLICATIONS

This application is a National Stage of International Application No. PCT/JP2017/035429 filed Sep. 29, 2017, claiming priority based on Japanese Patent Application No. 2016-254977 filed Dec. 28, 2016.

TECHNICAL FIELD

The present invention relates to a method for producing conductive polymer compounds (conductive polymers). Specifically, the present invention relates to a method for producing polyisothianaphthene-based conductive polymers comprising simplified polymerization and purification processes.

Recently, electroconductive polymer materials obtained by doping an electron-accepting compound as a dopant to a Π-conjugated polymer typified by polyacetylene, polythiophene, polyaniline, polypyrrole, polyphenylene, and poly(p-phenylene-vinylene) have been developed, and applications to an antistatic agent, a solid electrolyte for a capacitor, an electro conductive coating, an electrochromic device, an electrode material, a thermoelectric conversion material, a transparent conductive film, a chemical sensor, an actuator and the like have been considered. Among the above-described Π-conjugated polymers, polythiophene is excellent in chemical stability and is useful.

Generally, conductive polymers are manufactured by mixing a monomer to obtain a conductive high-molecular-weight polymer and an oxidizing agent and subjecting the mixture to chemical oxidative polymerization or electropolymerization (Patent Documents 1-10).

BACKGROUND ART

Patent Documents

Patent Document 1: JP 2013-539806 A (WO 2012/048823)
Patent Document 2: JP 2015-117367 A
Patent Document 3: JP 2015-21100 A
Patent Document 4: JP 2011-510141 A (U.S. Pat. No. 8,721,928)
Patent Document 5: JP 2003-261654 A
Patent Document 6: WO 2011/004833 (US 2012/104308 A1)
Patent Document 7: JP 2002-158144 A (U.S. Pat. No. 6,614,063)
Patent Document 8: JP 2009-130018 A (U.S. Pat. No. 8,027,151)
Patent Document 9: JP 2005-158882 A
Patent Document 10: JP 2008-214401 A

DISCLOSURE OF THE INVENTION

Problems to be Solved by the Invention

However, in a method using a metallic catalyst and the like, a treatment process to wash or remove the catalyst. When manufacturing a PEDOT:PSS aqueous dispersion obtained by polymerizing 3,4-ethylenedioxythiophene (EDOT) in an aqueous solution of water-soluble polymer such as polystyrene sulfonate (PSS) serving as a dopant, an ion-exchange resin is used to remove a substance used as a catalyst, which makes the process cumbersome. In order to manufacture a purpose-designed liquid in terms of viscosity, particle diameter, stability of the dispersion and the like, the dispersion concentration is limited to around few hundredth of a percent of a solid content. In addition, it is necessary to add PSS in an amount equal to the dopant amount or more to make the liquid to a dispersion, and a region which does not contribute to the conductive property appears when the dispersion is made into a film (Patent Documents 1-4). In addition, in order to improve the affinity for a solvent of the PEDOT structure that has a high crystallinity and liable to be insoluble, it is necessary to introduce a substituent to EDOT or to design a dopant (Patent Documents 5, 6).

In a method using an electropolymerization, there are limiting conditions that an electropolymerization device is required and that a polymer can be formed only on the surface of the electrode having conductivity (Patent Documents 8, 9).

When a dispersion containing a solvent other than water is produced, a method of performing polymerization in a water solvent first, adding a solvent and reversing the solvent phase is employed (Patent Document 10).

Objectives of the present invention are given below.

(1) To provide a conductive polymer film from a monomer liquid without a cumbersome process of polymerization/purification.

(2) To provide a liquid of conductive polymer precursor in which it is possible to easily adjust the solvent affinity, the solubility, and other such aspects of performance according to the purpose.

(3) To provide a one-liquid type high concentration conductive polymer solution that can form a conductive polymer film.

In addition, the present invention also aims to provide:

(4) a method of producing non-aqueous conductive polymer dispersion easily from the above-described conductive polymer of the present invention.

Means to Solve Problem

As a result of intensive study, the present inventors have found that the targeted conductive polymer can be obtained by homopolymerization or copolymerization of a compound having a benzo[c]thiophene-1,3-dihydro-2-oxide skeleton as being an isothianaphthene derivative in the presence of a compound having a sulfo group serving as a substituent having a dopant ability and a catalytic ability, and have accomplished the present invention.

The present invention relates to a method of producing the conductive polymer as described in the following [1] to [13], the conductive polymer described in [14], and the conductive polymer dispersion described in [15].

[1] A method of producing a polyisothianaphthene-based conductive polymer, comprising polymerizing at least one compound (A1) represented by formula (1) in the presence of a compound (B) having a sulfo group

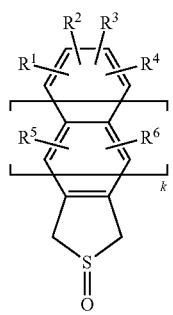

(1)

in the formula, $R^1$, $R^2$, $R^3$, $R^4$, $R^5$, and $R^6$ independently represent a monovalent substituent selected from a group consisting of (1) a hydrogen atom, (2) linear or branched alkyl group having 1 to 20 carbon atoms, linear or branched alkoxy group having 1 to 20 carbon atoms, or linear or branched alkyl ester group (alkylcarbonyloxy group or alkoxycarbonyl group) having 1 to 20 carbon atoms, (3) $SO_2M$, (4) a halogen atom, (5) carboxy group, (6) phosphonyl group, (7) nitro group, (8) cyano group, (9) primary, secondary or tertiary amino group, (10) trihalomethyl group, (11) phenyl group, and (12) phenyl group substituted with at least one member selected from alkyl group, hydroxy group, alkoxy group, alkyl ester group, carbonyl group and a halogen atom. Hydrocarbon chains in the substituent represented by $R^1$, $R^2$, $R^3$, $R^4$, $R^5$, and $R^6$ are bound to one another at an arbitrary position and may form at least one bivalent chain that forms at least one three- to seven-membered ring structure of saturated or unsaturated hydrocarbon chain with the carbon atoms to which the substituent is bound. The alkyl group, alkoxy group, or alkyl ester group represented by $R^1$, $R^2$, $R^3$, $R^4$, $R^5$, and $R^6$, or a cyclic hydrocarbon chain constituted thereof may contain at least one bond selected from a carbonyl bond, an ether bond, an ester bond, an amide bond, a sulfide bond, a sulfinyl bond, sulphonyl bond, and an imino bond. M represents OH; alkali metal alkoxide selected from $O^-Na^+$, $O^-Li^+$, and $O^-K^+$; ammonium alkoxyde represented by $O^-NH_4^+$; linear or branched alkoxy group having 1 to 20 carbon atoms; or a halogen atom selected from chloride, fluorine, bromine, and iodine. k represents the number of condensed rings surrounded by a hetero ring and a benzene ring having substituents of $R^1$ to $R^4$, which is an integer from 0 to 3.

[2] The method of producing the polyisothianaphthene-based conductive polymer according to [1] above, wherein the compound (A1) is a compound in which k in the formula (1) is 0.

[3] The method of producing the polyisothianaphthene-based conductive polymer according to [1] or [2] above, wherein $R^1$, $R^2$, $R^3$, $R^4$, $R^5$, and $R^6$ in the formula (1) independently is a monovalent substituent selected from (1) a hydrogen atom, (2) linear or branched alkyl group having 1 to 20 carbon atoms, linear or branched alkoxy group having 1 to 20 carbon atoms, or linear or branched alkyl ester group having 1 to 20 carbon atoms, and (3) a halogen atom.

[4] A method of producing a polyisothianaphthene-based conductive polymer, comprising polymerizing at least one compound (A2) represented by formula (2)

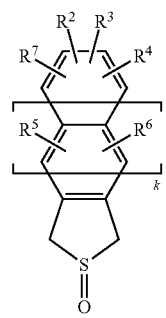

(2)

in the formula, $R^7$ is sulfo group. $R^2$, $R^3$, $R^4$, $R^5$, and $R^6$ independently represent a monovalent substituent selected from a group consisting of (1) a hydrogen atom, (2) linear or branched alkyl group having 1 to 20 carbon atoms, linear or branched alkoxy group having 1 to 20 carbon atoms, or linear or branched alkyl ester group (alkylcarbonyloxy group or alkoxycarbonyl group) having 1 to 20 carbon atoms, (3) $SO_2M$, (4) a halogen atom, (5) carboxy group, (6) phosphonyl group, (7) nitro group, (8) cyano group, (9) primary, secondary or tertiary amino group, (10) trihalomethyl group, (11) phenyl group, and (12) phenyl group substituted with at least one member selected from alkyl group, hydroxy group, alkoxy group, alkyl ester group, carbonyl group, sulfo group and a halogen atom. Hydrocarbon chains in the substituent represented by $R^2$, $R^3$, $R^4$, $R^5$, and $R^6$ are bound to one another at an arbitrary position and may form at least one bivalent chain that forms at least one three- to seven-membered ring structure of saturated or unsaturated hydrocarbon chain with the carbon atoms to which the substituent is bound. The alkyl group, alkoxy group, or alkyl ester group represented by $R^2$, $R^3$, $R^4$, $R^5$, and $R^6$, or a cyclic hydrocarbon chain constituted thereof may contain at least one bond selected from a carbonyl bond, an ether bond, an ester bond, an amide bond, a sulfide bond, a sulfinyl bond, sulphonyl bond, and an imino bond. M represents OH; alkali metal alkoxide selected from $O^-Na^+$, $O^-Li^+$, and $O^-K^+$; ammonium alkoxyde represented by $O^-NH_4^+$; linear or branched alkoxy group having 1 to 20 carbon atoms; or a halogen atom selected from chloride, fluorine, bromine, and iodine. k represents the number of condensed rings surrounded by a hetero ring and a benzene ring having substituents of $R^2$ to $R^4$, which is an integer from 0 to 3.

[5] The method of producing the polyisothianaphthene-based conductive polymer according to [4] above, wherein the compound (A2) is a compound in which k in the formula (2) is 0.

[6] The method of producing the polyisothianaphthene-based conductive polymer according to [4] or [5] above, wherein $R^2$, $R^3$, $R^4$, $R^5$, and $R^6$ in the formula (2) independently is a monovalent substituent selected from (1) a hydrogen atom, (2) linear or branched alkyl group having 1 to 20 carbon atoms, linear or branched alkoxy group having 1 to 20 carbon atoms, or linear or branched alkyl ester group having 1 to 20 carbon atoms, and (3) a halogen atom.

[7] A method of producing a polyisothianaphthene-based conductive polymer, comprising copolymerizing at least one of compounds (A1) represented by the formula (1) in [1] above and at least one of compounds (A2) represented by the formula (2) in [4] above.

[8] A method of producing a polyisothianaphthene-based conductive polymer, comprising copolymerizing compound (D), which can be copolymerized with the compound (A1) represented by the formula (1) in [1] above and the compound (A2) represented by the formula (2) in [4] above, and at least one of the compounds (A1) represented by the formula (1) in the presence of a compound (B) having sulfo group.

[9] A method of producing a polyisothianaphthene-based conductive polymer, comprising copolymerizing compound (D), which can be copolymerized with the compound (A1) represented by the formula (1) in [1] above and the compound (A2) represented by the formula (2) in [4] above, and at least one of the compounds (A2) represented by the formula (2).

[10] A method of producing a polyisothianaphthene-based conductive polymer, comprising copolymerizing compound (D), which can be copolymerized with the compound (A1) represented by the formula (1) in [1] above and the compound (A2) represented by the formula (2) in [4] above; at least one of the compounds (A1) represented by the formula (1), and at least one of the compounds (A2) represented by the formula (2).

[11] The method of producing a polyisothianaphthene-based conductive polymer according to any one of [1] to [10] above, wherein the polymerization is performed without using an oxidizing agent.

[12] The method of producing a polyisothianaphthene-based conductive polymer according to any one of [1] to [11] above, wherein the polymerization is performed while removing the generated water.

[13] The method of producing a polyisothianaphthene-based conductive polymer according to any one of [1] to [12] above, comprising a solvent having a vapor pressure higher than water.

[14] A polyisothianaphthene-based conductive polymer obtained by the method according to any one of [1] to [13] above.

[15] A dispersion of the polyisothianaphthene-based conductive polymer according to [14] above.

Effects of Invention

According to the present invention,
1) it is possible to prepare a conductive polymer film from a monomer liquid without a cumbersome process of polymerization/purification;
2) it is possible obtain a liquid of conductive polymer precursor in which it is possible to easily adjust the solvent affinity, the solubility, and other such aspects of performance according to the purpose; and
3) it is possible to obtain a one-liquid type high concentration conductive polymer solution that can form a conductive polymer film. Furthermore, 4) it is possible to easily produce a non-aqueous conductive polymer dispersion from the conductive polymer of the present invention.

BRIEF DESCRIPTION OF DRAWINGS

FIG. 1 The figure is for showing the TG-DTA curve of the polymer (polyisothianaphthene) obtained in Example 4.

FIG. 2 The figure is for showing the TG-DTA curve of the polymer (polyisothianaphthene) obtained in Comparative Example 4.

FIG. 3 The figure is for showing the TG-DTA curve of the polymer (polyisothianaphthene) obtained in Example 8.

FIG. 4 The figure is for showing the TG-DTA curve of the polymer (polyisothianaphthene) obtained in Comparative Example 6.

MODE FOR CARRYING OUT INVENTION

Hereinafter, the present invention is described in more detail.

The method of producing the conductive polymer of the present invention is any one of the methods (i) to (iii) given below.

Method (i): At least one of compounds (A1) represented by the formula (1) is polymerized in the presence of a compound (B) having sulfo group.

Method (ii): At least one of compounds (A2) represented by the formula (2) is polymerized.

Method (iii): At least one of compounds (A1) and at least one of compounds (A2) are copolymerized.

<Method (i)>

A conductive polymer can be obtained by polymerizing at least one of the compounds (A1) represented by the formula (1) in the presence of a compound (B) having sulfo group.

<Compound (A1)>

The compound (A1) used in the present invention is a compound represented by the formula (1).

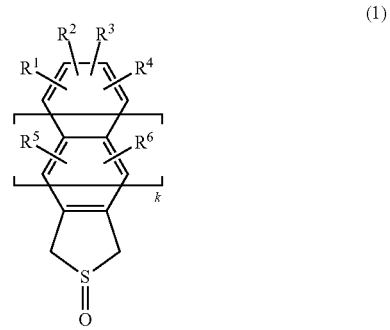

(1)

In the formula (1), $R^1$, $R^2$, $R^3$, $R^4$, $R^5$, and $R^6$ independently represent a monovalent substituent selected from a group consisting of (1) a hydrogen atom, (2) linear or branched alkyl group having 1 to 20 carbon atoms, linear or branched alkoxy group having 1 to 20 carbon atoms, or linear or branched alkyl ester group (alkylcarbonyloxy group or alkoxycarbonyl group) having 1 to 20 carbon atoms, (3) $SO_2M$, (4) a halogen atom, (5) carboxy group, (6) phosphonyl group, (7) nitro group, (8) cyano group, (9) primary, secondary or tertiary amino group, (10) trihalomethyl group, (11) phenyl group, and (12) phenyl group substituted with at least one member selected from alkyl group, hydroxy group, alkoxy group, alkyl ester group, carbonyl group and a halogen atom. M represents OH; alkali metal alkoxide selected from $O^-Na^+$, $O^-Li^+$, and $O^-K^+$; ammonium alkoxyde represented by $O^-NH_4+$; linear or branched alkoxy group having 1 to 20 carbon atoms; or a halogen atom selected from chloride, fluorine, bromine, and iodine.

Useful examples of the substituents $R^1$, $R^2$, $R^3$, $R^4$, $R^5$, and $R^6$ include a hydrogen atom, a halogen atom, $SO_2M$, alkyl group, alkoxy group, alkyl ester group, nitro group and cyano group.

When these substituents are exemplified in more detail, examples of a halogen atom include fluorine, chlorine, bromine and iodine, and examples of hydrocarbon chains of alkyl group or alkyl ester group include methyl, ethyl, propyl, isopropyl, n-butyl, isobutyl, t-butyl, pentyl, hexyl, octyl, dodecyl, tetradecyl, cyclopentyl, and cyclohexyl. Examples of the alkoxy group include methoxy group, ethoxy group, (2-methoxy)ethoxy group, propoxy group, isopropoxy group, hexyloxy group, octyloxy group, and dodecyloxy group. Alkyl ester group is specifically alkylcarbonyloxy group and alkoxycarbonyloxy group, for example, such as malonate ester group (—OCOH$_2$CO$_2$H), fumarate ester group (—OCOCH=CHCO$_2$H; a double bond is trans-form), and maleate ester group (—OCOCH=CHCO$_2$H, a double bond is cis-form). In addition, examples include alkylcarbonyloxy group and alkoxycarbonyloxy group, in which alkyl group is methyl group, ethyl group, n-propyl group, isopropyl group, n-butyl group, isobutyl group, t-butyl group, pentyl group, hexyl group, octyl group, dodecyl group, tetradecyl group, cyclopentyl group, cyclohexyl group and the like.

Furthermore, examples of substituents other than those described above include amino group such as methyl amino group, ethyl amino group, diphenyl amino group and anilino group; trifluoromethyl group, chlorophenyl group, and acetamide group.

$R^5$ and $R^6$ are preferably a hydrogen atom. With respect to $R^1$, $R^2$, $R^3$, and $R^4$, preferably at least two, more preferably three, most preferably all of the four are a hydrogen atom.

Hydrocarbon chains in the substituents represented by $R^1$, $R^2$, $R^3$, $R^4$, $R^5$, and $R^6$ are bound to one another at an arbitrary position and may form at least one bivalent chain that forms at least one three- to seven-membered ring structure of saturated or unsaturated hydrocarbon chain with the carbon atoms to which the substituent is bound.

The alkyl group, alkoxy group, or alkyl ester group represented by $R^1$, $R^2$, $R^3$, $R^4$, $R^5$, and $R^6$, or a cyclic hydrocarbon chain constituted thereof may contain at least one bond selected from a carbonyl bond, an ether bond, an ester bond, an amide bond, a sulfide bond, a sulfinyl bond, sulphonyl bond, and an imino bond.

Examples of three- to seven-membered ring structures of saturated or unsaturated hydrocarbon formed by hydrocarbon chains of $R^1$, $R^2$, $R^3$, $R^4$, $R^5$, or $R^6$ in formula (1) bound to one another at an arbitrary position include the structures represented by the following formulae (3) to (5).

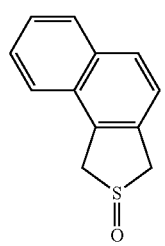

(3)

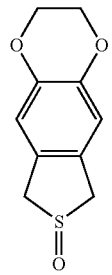

(4)

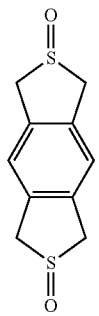

(5)

k represents the number of condensed rings surrounded by a 1,3-dihydrothiophene-S-oxide ring and a benzene ring having substituents of $R^1$ to $R^4$ (formula (1)), which is an integer from 0 to 3. k is preferably 0 from the viewpoint of solubility in a solvent.

Examples of the basic skeletons excluding the substituents $R^1$ to $R^6$ of the compounds represented by formula (1) includes 1,3-dihydroisothianaphthene-S-oxide (a compound in which k is 0).

As a compound represented by formula (1), at least one member selected from benzo[c]thiophene-1,3-dihydro-2-oxide and naphtho[2,3-c]thiophene-1,3-dihydro-2-oxide, which may have a substituent, can be preferably used.

Specific examples include benzo[c]thiophene-1,3-dihydro-2-oxide, benzo[c]thiophene-1,3-dihydro-5-methyl-2-oxide, benzo[c]thiophene-1,3-dihydro-5,6-dimethyl-2-oxide, benzo[c]thiophene-1,3-dihydro-5-methanol-2-oxide, benzo[c]thiophene-1,3-dihydro-5-hydroxy-2-oxide, benzo[c]thiophene-1,3-dihydro-5-fluoro-2-oxide, benzo[c]thiophene-1,3-dihydro-5-chloro-2-oxide, benzo[c]thiophene-1,3-dihydro-5-bromo-2-oxide, benzo[c]thiophene-1,3-dihydro-5-ol-2-oxide, naphtho[2,3-c]thiophene-1,3-dihydro-2-oxide, and naphtho[2,3-c]thiophene-1,3-dihydro-4-phenyl-2-oxide, but not limited to the above. The compound (A1) can be used alone or in combination of two or more thereof.

It is possible to use at least one of the compounds represented by formula (1-2) instead of the compound (A1).

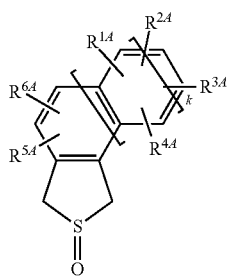

(1-2)

In the above-described formula (1-2), $R^{1A}$, $R^{2A}$, $R^{3A}$, $R^{4A}$, $R^{5A}$, $R^{6A}$ and k each have the same meaning as $R^1$, $R^2$, $R^3$, $R^4$, $R^5$, $R^6$ and k in the above-described formula (1).

$R^{5A}$ and $R^{6A}$ are preferably a hydrogen atom. With respect to $R^{1A}$, $R^{2A}$, $R^{3A}$, and $R^{4A}$, preferably at least two, more preferably three, most preferably all of the four are a hydrogen atom.

[Compound (B) Having Sulfo Group]

It is considered that Compound (B) having sulfo group has a dopant ability and a catalytic ability by allowing it to coexist with Compound (A1). The Compound (B) having sulfo group is not particularly limited as long as it is a compound having one or more sulfo groups in a molecule. Examples thereof include a low-molecular sulfonic acid and a sulfonic acid polymer. A sulfonate compound can be used after an ion exchange processing.

Examples of a low-molecular sulfonic acid include sulfuric acid, alkyl sulfonic acid, benzene sulfonic acid, naphthalene sulfonic acid, anthraquinone sulfonic acid, camphor sulfonic acid, and a derivative thereof. These low-molecular sulfonic acid may be monosulfonic acid, disulfonic acid or trisulfonic acid. Examples of a derivative of alkyl sulfonic acid include 2-acrylamide-2-methylpropane sulfonic acid. Examples of a derivative of benzene sulfonic acid include phenol sulfonic acid, styrene sulfonic acid, toluene sulfonic acid, and dodecyl benzene sulfonic acid. Examples of a derivative of naphthalene sulfonic acid include 1-naphthalene sulfonic acid, 2-naphthalene sulfonic acid, 1,3-naphthalene disulfonic acid, 1,3,6-naphthalene trisulfonic acid, and 6-ethyl-1-naphthalene sulfonic acid. Examples of a derivative of anthraquinone sulfonic acid includes anthraquinone-1-sulfonic acid, anthraquinone-2-sulfonic acid, anthraquinone-2,6-disulfonic acid, and 2-methylanthraquinone-6-sulfonic acid. Among these, preferred are 1-naphthalene sulfonic acid, 2-naphthalene sulfonic acid, 1,3,6-naphthalene trisulfonic acid, anthraquinone sulfonic acid, anthraquinone disulfonic acid, p-toluene sulfonic acid and camphor sulfonic acid.

Examples of a polymer having one or more sulfo group in a molecule include polyvinyl sulfonic acid, polystyrene sulfonic acid, polyallyl sulfonic acid, polyethyl acrylate sulfonic acid, polybutyl acrylate sulfonic acid, poly(2-acrylamido-2-methylpropane sulfonic acid), and polyisoprene sulfonic acid. These may be a homopolymer or a copolymer of two or more monomers. Among these, preferred are polystyrene sulfonic acid, polyisoprene sulfonic acid, polyethyl acrylate sulfonic acid, and polybutyl acrylate sulfonic acid.

The molecular weight of the polymer having sulfo group is not particularly limited, but the weight average molecular weight is preferably 1,000,000 or less, more preferably 500,000 or less, and still more preferably 300,000 or less. When the weight average molecular weight is 1,000,000 or less, it can be easily handled due to good solubility of the polymer in the system.

A polymer having sulfo group can mitigate thermal decomposition of a conjugated conductive polymer, improve the dispersibility of a monomer to obtain a conjugated conductive polymer in a dispersion medium, and furthermore can function as a dopant of the conjugated conductive polymer.

These Compounds (B) having sulfo group may be used singly or in combination of two or more thereof.

In the above-described Method (i), a conductive polymer can be obtained by polymerizing at least one of the above-mentioned Compounds (A1) in the presence of the Compound (B) having sulfo group. The amount of the Compound (B) having sulfo group is preferably 1 to 400 moles, more preferably 5 to 300 moles, still more preferably 10 to 250 moles to 100 moles of the above-mentioned Compound (A1) in terms of sulfo group. If the amount of the Compound (B) is 1 to 400 moles to 100 moles of the above-mentioned Compound (A1) in terms of sulfo group, it is desirable from the viewpoint of a conversion and a reaction rate.

<Method (ii)>

A conductive polymer can be obtained by polymerizing at least one of the Compounds (A2) represented by formula (2). It is possible to polymerize the Compound (A2) without the presence of the Compound (B) having sulfo group. It is considered due to the fact that not only that the Compound (A2) is a constituent unit of the conductive polymer but the compound itself has sulfo group which combines a dopant ability and a catalytic ability. In the Method (ii), the above-mentioned Compound (B) having sulfo group may be contained besides the above-mentioned Compound (A2).

[Compound (A2)]

The Compound (A2) is a compound represented by formula (2).

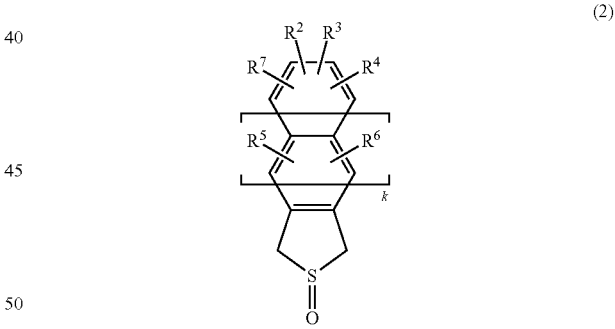

(2)

In the formula, $R^2$ is sulfo group. $R^2$, $R^3$, $R^4$, $R^5$, and $R^6$ independently represent a monovalent substituent selected from a group consisting of (1) a hydrogen atom, (2) linear or branched alkyl group having 1 to 20 carbon atoms, linear or branched alkoxy group having 1 to 20 carbon atoms, or linear or branched alkyl ester group (alkylcarbonyloxy group or alkoxycarbonyl group) having 1 to 20 carbon atoms, (3) $SO_2M$, (4) a halogen atom, (5) carboxy group, (6) phosphonyl group, (7) nitro group, (8) cyano group, (9) primary, secondary or tertiary amino group, (10) trihalomethyl group, (11) phenyl group, and (12) phenyl group substituted with at least one member selected from alkyl group, hydroxy group, alkoxy group, alkyl ester group, carbonyl group, sulfo group and a halogen atom, and (13) sulfo group. M represents OH; alkali metal alkoxide selected from O⁻Na⁺, O⁻Li⁺, and O⁻K⁺; ammonium alkoxyde represented by O⁻NH₄+; linear or branched alkoxy group having 1 to 20 carbon atoms; or a halogen atom selected from chloride, fluorine, bromine, and iodine.

Examples of useful substituents $R^2$, $R^3$, $R^4$, $R^5$, and $R^6$ include a hydrogen atom, a halogen atom, SO₂M, alkyl group, alkoxy group, alkyl ester group, nitro group and cyano group.

When these substituents are exemplified in more detail, examples of a halogen atom include fluorine, chlorine, bromine and iodine, and examples of hydrocarbon chains of alkyl group or alkyl ester group include methyl, ethyl, propyl, isopropyl, n-butyl, isobutyl, t-butyl, pentyl, hexyl, octyl, dodecyl, tetradecyl, cyclopentyl, and cyclohexyl. Examples of the alkoxy group include methoxy group, ethoxy group, (2-methoxy)ethoxy group, propoxy group, isopropoxy group, hexyloxy group, octyloxy group, and dodecyloxy group. Alkyl ester group is specifically alkylcarbonyloxy group and alkoxycarbonyloxy group, for example, such as malonate ester group (—OCOH₂CO₂H), fumarate ester group (—OCOCH═CHCO₂H; a double bond is trans-form), and maleate ester group (—OCOCH═CHCO₂H, a double bond is cis-form). In addition, examples include alkylcarbonyloxy group and alkoxycarbonyloxy group, in which alkyl group is methyl group, ethyl group, n-propyl group, isopropyl group, n-butyl group, isobutyl group, t-butyl group, pentyl group, hexyl group, octyl group, dodecyl group, tetradecyl group, cyclopentyl group, cyclohexyl group and the like.

Furthermore, examples of substituents other than those described above include amino group such as methyl amino group, ethyl amino group, diphenyl amino group and anilino group; trifluoromethyl group, chlorophenyl group, and acetamide group.

Hydrocarbon chains in the substituents represented by $R^2$, $R^3$, $R^4$, $R^5$, and $R^6$ are bound to one another at an arbitrary position and may form at least one bivalent chain that forms at least one three- to seven-membered ring structure of saturated or unsaturated hydrocarbon chain with the carbon atoms to which the substituent is bound. The alkyl group, alkoxy group, or alkyl ester group represented by $R^2$, $R^3$, $R^4$, $R^5$, and $R^6$, or a cyclic hydrocarbon chain constituted thereof may contain at least one bond selected from a carbonyl bond, an ether bond, an ester bond, an amide bond, a sulfide bond, a sulfinyl bond, sulphonyl bond, and an imino bond.

Examples of three- to seven-membered ring structures of saturated or unsaturated hydrocarbon formed by hydrocarbon chains of $R^2$, $R^3$, $R^4$, $R^5$, or $R^6$ in formula (2) bound to one another at an arbitrary position include the structures represented by the following formulae (6) to (8).

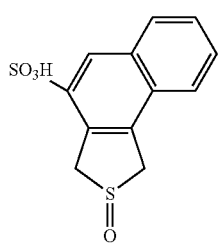

(6)

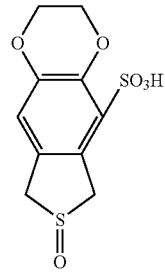

(7)

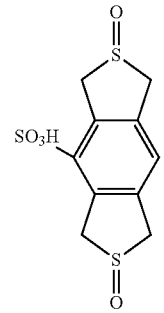

(8)

Other than the compound (A2), at least one compound selected from the group of compounds represented by formula (2-2) may be used.

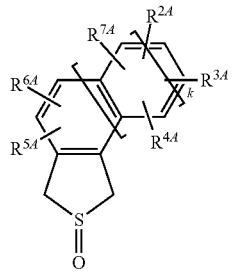

(2-2)

In formula (2-2), $R^{7A}$ is sulfo group. $R^{2A}$, $R^{3A}$, $R^{4A}$, $R^{5A}$, $R^{6A}$ and k in formula (2-2) have the same meanings as $R^2$, $R^3$, $R^4$, $R^5$, $R^6$ and k in formula (2).

$R^{5A}$ and $R^{6A}$ are preferably a hydrogen atom. With respect to $R^{2A}$, $R^{3A}$, and $R^{4A}$, preferably at least two, more preferably all of the three are a hydrogen atom.

k represents the number of condensed rings surrounded by a benzene ring having substituents of $R^2$ to $R^4$, which is an integer from 0 to 3. k is preferably 0 from the viewpoint of solubility in a solvent.

Examples of the basic skeletons excluding the substituents $R^2$ to $R^7$ of the compounds represented by formula (2) includes 1,3-dihydoroisothianaphthene-S-oxide (a compound in which k is 0).

As a compound represented by formula (2), at least one member selected from benzo[c]thiophene-1,3-dihydro-2-oxide-4-sulfonic acid, benzo[c]thiophene-1,3-dihydro-2-oxide-5-sulfonic acid, benzo[c]thiophene-1,3-dihydro-2-oxide-5,6-disulfonic acid, benzo[c]thiophene-1,3-dihydro-2-oxide-4,5-disulfonic acid, benzo[c]thiophene-1,3-dihydro-2-oxide-4,6-disulfonic acid, and benzo[c]thiophene-1,3-dihydro-2-oxide-4,7-disulfonic acid.

$R^5$ and $R^6$ are preferably a hydrogen atom. With respect to $R^2$, $R^3$, and $R^4$, preferably at least one, more preferably at least two, particularly preferably all of the three are a hydrogen atom.

Specifically, examples include benzo[c]thiophene-1,3-dihydro-2-oxide-5-sulfonic acid, and benzo[c]thiophene-1,3-dihydro-2-oxide-5,6-disulfonic acid.

The compound (A2) may be used singly or in combination of two or more thereof.

<Method (iii)>

A conductive polymer can be obtained by copolymerizing at least one of the Compounds (A1) and at least one of the Compounds (A2). The above-mentioned Compound (B) having sulfo group may further be contained in the Method (iii) as well. In addition, at least one of the compounds represented by formula (1-2) may be used instead of the compound (A1) in the Method (iii) as well. Similarly, at least one of the compounds represented by formula (2-2) may be used instead of the compound (A2).

The amount of the Compound (A2) is preferably 1 to 400 moles, more preferably 5 to 300 moles, still more preferably 10 to 250 moles to 100 moles of the above-mentioned Compound (A1) in terms of sulfo group. If the amount of the Compound (B) is 1 to 400 moles to 100 moles of the above-mentioned Compound (A1) in terms of sulfo group, it is desirable from the viewpoint of a conversion and a reaction rate.

By copolymerizing the compound (A1) and the compound (A2) at an arbitrary ratio, it is possible to easily adjust the solvent affinity, the solubility, and other such aspects of performance according to the purpose.

For example, when copolymerization of benzo[c]thiophene-1,3-dihydro-2-oxido as the compound (A1) and benzo[c]thiophene-1,3-dihydro-2-oxido-5-sulfonic acid as the compound (A2) is conducted, the two compounds have a different degree of water-solubility and therefore, as the ratio of benzo[c]thiophene-1,3-dihydro-2-oxido increases, the generated conductive polymer has a lower water-solubility and becomes insolubilized.

Also, as the ratio of benzo[c]thiophene-1,3-dihydro-2-oxido increases, the crystallized region in a polyisothianaphthene skeleton enlarges and the conductivity tends to be improved.

The matters set forth below are common to the methods (i) to (iii).

[Solvent C]

In the polymerization in the present invention, it is desirable to use a solvent from the viewpoint of substance diffusion. A solvent to be used is not particularly limited as long as a monomer to be used dissolves in the solvent. Examples of the solvent include water, methanol, ethanol, isopropanol, toluene, butanol, acetic acid, acetic anhydride, dimethylformamide, dimethyl sulfoxide, γ-butyrolactone, propylene carbonate, sulfolane, N-methylpyrrolidone, dimethylsulfolane, butandiol, ethylene glycol, diethylene glycol, glycerol (glycerin), diglycerol (diglycerin), and polyethylene glycol.

From the viewpoint of ease in handling industrially, preferred are water, methanol, ethanol, isopropanol, dimethylformamide, ethylene glycol, and dimethyl sulfoxide. More preferred are water, ethanol, isopropanol, ethylene glycol and dimethyl sulfoxide.

In the case where the reaction is developed while evaporating water as described below, it is desirable to use as a part or a whole of the solvent a solvent having a boiling point higher than water.

The solvent having a higher boiling point than water is preferably a solvent having a boiling point of 105° C. or higher. Specific examples include toluene (boiling point: 111° C.), butanol (boiling point: 118° C.), acetic anhydride (boiling point: 140° C.), dimethylformamide (boiling point: 153° C.), dimethylsulfoxide (boiling point: 189° C.), γ-butyrolactone (boiling point: 203° C.), propylene carbonate (boiling point: 240° C.), sulfolane (boiling point: 285° C.), N-methylpyrrolidone (boiling point: 202° C.), butanediol (boiling point: 230° C.), ethylene glycol (boiling point: 198° C.), diethylene glycol (boiling point: 244° C.), glycerol (glycerin, boiling point: 290° C.), diglycerol (diglycerin, boiling point 265° C. (15 mmHg)), and polyethylene glycol. Although some kinds of polyethylene glycol such as polyethylene glycol 400, polyethylene glycol 600 and polyethylene glycol 1500 (the number after "polyethylene glycol" represents the molecular weight) have no boiling point under ordinary pressure, polyethylene glycols that are volatilized under reduced pressure are to be included in solvents having a boiling point higher than water. When the boiling point is indicated, the boiling point with no annotation of the pressure provided in parentheses means a boiling point under ordinary pressure. Among these solvents having a higher boiling point than water, preferred is ethylene glycol or dimethylsulfoxide, which is miscible with water and does not form an azeotropic composition with water, from viewpoints of ease in handling and drying, and the acid resistance.

It is presumed that by using a solvent having a higher boiling point as a part or a whole of the solvent, the substance diffusion is not to be prevented when water generated by the polymerization reaction evaporates, and thus the reaction rate is improved.

The ratio of the solvent (C) in the reaction system is preferably 0.1 to 99.5 mass %, more preferably 5 to 99 mass %, still more preferably 30 to 95 mass %. When the ratio of the solvent (C) in the reaction system is 0.1 to 99.5 mass %, a good conversion and a good reaction rate can be obtained.

The solution concentration differs depending on the composition but the solution has a solid content of preferably 0.01 to 60 mass %, more preferably 0.1 to 50 mass %, still more preferably 1 to 30 mass %. When the solution concentration is set to be within the above-mentioned range, it is possible to perform polymerization at an appropriate reaction rate and to produce the conductive polymer stably and economically in a short time, and the storage stability of the solution is improved.

As described below, in the case where the monomer solution, the dopant, and the catalytic solution are separated and mixed at the time of polymerization to be used, the upper limit of the concentration of each solution is not limited thereto and each solution can be used at a concentration of between 0.01 to 100 mass %.

The solvent having a higher boiling point than water is preferably 0.1 to 99.5 mass %, more preferably 1 to 80 mass %, still more preferably 5 to 70 mass % to the total of the solvent (C). When the ratio of the solvent (C) in the reaction system is 0.1 to 99.5 mass %, it makes it possible to produce a reaction with high productivity.

With respect to the conductivity improver to be added at the time of polymerization, it is desirable to use the one that forms an azeotrope with water and can be dehydrated using Dean-Stark apparatus and the like.

These solvents can be used singly or in combination of two or more thereof.

[Compound (D) that is Copolymerizable with Compound (A1) or Compound (A2)]

In the present invention, Compound (D) that is copolymerizable with Compounds (A1) and (A2) can be copolymerized. In the method (i), the Compound (A1) and the Compound (D) can be copolymerized in the presence of the Compound (B) having sulfo group. In the method (ii), the Compound (A2) and the Compound (D) can be copolymerized. In the method (iii), the Compounds (A1) and (A2) and the Compound (D) can be copolymerized.

Examples of the Compound (D) include aromatic compounds such as isothianaphthene, isobenzofuran, isobenzoindoline, isobenzoselenaphene, isobenzoterenaphene, thiophene, pyrrole, furan, selenophene, tellurophene, aniline, benzene, naphto[2,3-c]thiophene, anthra[2,3-c]thiophene, naphthaceno[2,3-c]thiophene, pentaceno[2,3-c]thiophene, perylo[2,3-c]thiphene, acenaphto[2,3-c]thiophene; a compound capable of forming a Π-conjugated structure at the time of copolymerization such as 1,3-dihydroisothianaphthene, 1,3-dihydronaphtho[2,3-c]thiophene, 1,3-dihydroanthra[2,3-c]thiophene, 1,3-dihydronaphthaceno[2,3-c]thiophene, 1,3-dihydropentaceno[2,3-c]thiophene, 1,3-dihydropentaceno[2,3-c]thiophene, 1,3-dihydroperylo[2,3-c]thiophene, and 1,3-dihydroacenaphto[2,3-c]thiophene; a compound containing nitrogen in a condensed ring such as thieno[c]pyridine, thieno[c]pyrazine, thieno[c]pyridazine, thieno[c]quinoxaline, 1,3-dihydrothieno[c]pyridine, 1,3-dihydrothieno[c]pyrazine, 1,3-dihydrothieno[c]pyridazine and 1,3-dihydrothieno[c]quinoxaline; and a derivative having various substituents thereof, for example, (2) linear or branched alkyl group having 1 to 20 carbon atoms, linear or branched alkoxy group having 1 to 20 carbon atoms, or linear or branched alkyl ester group having 1 to 20 carbon atoms, (3) $SO_2M$, (4) a halogen atom, (5) carboxy group, (6) phosphonyl group, (7) nitro group, (8) cyano group, (9) primary, secondary or tertiary amino group, (10) trihalomethyl group, (11) phenyl group, and (12) phenyl group substituted with at least one member selected from alkyl group, hydroxy group, alkoxy group, alkyl ester group, carbonyl group, sulfo group and a halogen atom. Here, preferred substituents include the same as those described in the substituents $R_2$, $R_3$, $R_4$, $R_5$, and $R_6$.

Examples thereof include 1,3-dihydroisothianaphthene, 4-methyl-1,3-dihydroisothianaphthene, 5-methyl-1,3-dihydroisothianaphthene, 4,5-dimethyl-1,3-dihydroisothianaphthene, 5,6-dimethyl-1,3-dihydroisothianaphthene, 4,7-dimethyl-1,3-dihydroisothianaphthene, 5-fluoro-1,3-dihydroisothianaphthene, 5-chloro-1,3-dihydroisothianaphthene, 5-bromo-1,3-dihydroisothianaphthene, 5-hydroxy-1,3-dihydroisothianaphthene, 5-carboxy-1,3-dihydroisothianaphthene, pyrrole, 3-methylpyrrole, 3,4-dimethylpyrrole, 3-fluoropyrrole, 3-chloropyrrole, 3-bromopyrrole, N-methylpyrrole, 3-hydroxypyrrole, 3-carboxypyrrole, isoindole, 4-methylisoindole, 5-methylisoindole, 4,5-dimethylisoindole, 5,6-dimethylisoindole, 4,7-dimethylisoindole, 5-fluoroisoindole, 5-chloroisoindole, 5-bromoisoindole, 5-hydroxyisoindole, 5-carboxyisoindole, 2,3-dihydroisoindole, 4-methyl-2,3-dihydroisoindole, 5-methyl-2,3-dihydroisoindole, 4,5-dimethyl-2,3-dihydroisoindole, 5,6-dimethyl-2,3-dihydroisoindole, 4,7-dimethyl-2,3-dihydroisoindole, 5-fluoro-2,3-dihydroisoindole, 5-chloro-2,3-dihydroisoindole, 5-bromo-2,3-dihydroisoindole, 5-hydroxy-2,3-dihydroisoindole, 5-carboxy-2,3-dihydroisoindolefuran, 3-methylfuran, 3,4-dimethylfuran, 3-fluorofuran, 3-chlorofuran, 3-bromofuran, isobenzofuran, 4-methylisobenzofuran, 5-methylisobenzofuran, 4,5-dimethylisobenzofuran, 5,6-dimethylisobenzofuran, 4,7-dimethylisobenzofuran, 5-fluoroisobenzofuran, 5-hydroxyisobenzofuran, 5-carboxyisobenzofuran, 1,3-dihydrobenzo[c]selenophene, 4-methyl-1,3-dihydrobenzo[c]selenophene, 5-methyl-1,3-dihydrobenzo[c]selenophene, 4,5-dimethyl-1,3-dihydrobenzo[c]selenophene, 5,6-dimethyl-1,3-dihydrobenzo[c]selenophene, 4,7-dimethyl-1,3-dihydrobenzo[c]selenophene, 5-fluoro-1,3-dihydrobenzo[c]selenophene, 5-chloro-1,3-dihydrobenzo[c]selenophene, 5-bromo-1,3-dihydrobenzo[c]selenophene, 5-hydroxy-1,3-dihydrobenzo[c]selenophene, 5-carboxy-1,3-dihydrobenzo[c]selenophene, 1,3-dihydrobenzo[c]selenophene-2-oxide, 4-methyl-1,3-dihydrobenzo[c]selenophene-2-oxide, 5-methyl-1,3-dihydrobenzo[c]selenophene-2-oxide, 4,5-dimethyl-1,3-dihydrobenzo[c]selenophene-2-oxide, 5,6-dimethyl-1,3-dihydrobenzo[c]selenophene-2-oxide, 4,7-dimethyl-1,3-dihydrobenzo[c]selenophene-2-oxide, 5-fluoro-1,3-dihydrobenzo[c]selenophene-2-oxide, 5-chloro-1,3-dihydrobenzo[c]selenophene-2-oxide, 5-bromo-1,3-dihydrobenzo[c]selenophene-2-oxide, 5-hydroxy-1,3-dihydrobenzo[c]selenophene-2-oxide, 5-carboxy-1,3-dihydrobenzo[c]selenophene-2-oxide, benzo[c]selenophene, 4-methyl-benzo[c]selenophene, 5-methyl-benzo[c]selenophene, 4,5-dimethyl-benzo[c]selenophene, 5,6-dimethyl-benzo[c]selenophene, 4,7-dimethyl-benzo[c]selenophene, 5-fluoro-benzo[c]selenophene, 5-chloro-benzo[c]selenophene, 5-bromo-benzo[c]selenophene, 5-hydroxy-benzo[c]selenophene, and 5-carboxy-benzo[c]selenophene, It is preferable to use the Compound (D) that is copolymerizable with the Compounds (A1) and (A2) in an amount of preferably 200 mol % or less, more preferably 100 mol % or less, still more preferably 50 mol % or less to the total of the mole number of the Compound (A1) and the Compound (A2). If the ratio of the Compound (D) is 200 mol % or less, the conversion and the reaction rate are appropriate.

[Additives]

Within a scope which does not affect the effects of the present invention, additives having other functions may be added at the time of reaction. For example, additives such as a surfactant, a thickener, a thixotropic agent, a rheology modifier and the like may be added to impart functionality such as a coating property, an impregnating property, and permeability. A binder and the like may be added to improve the binding property and heat resistance at the time of forming a film. A component having a function to reduce stress at the time of forming a film may be used.

These additives may have a substituent. Examples include dodecylbenzenesulfonic acid, polyvinyl alcohol, poly(N-vinylacetamide), polyacrylamide, and polyacrylic acid. The additives may be used singly or in combination of two or more thereof.

[Oxidizing Agent]

To cause the polymerization reaction of the conductive polymer, an oxidizing agent is generally used as a catalyst. Examples of the oxidizing agent include ferric chloride, ferric sulfate, ferric nitrate, ferric ethylenediamine tetraacetate, copper chloride, cuprous chloride, copper ethylenediamine tetraacetate, aluminum chloride, iodine, bromine, 2,3-dichloro-5,6-dicyano-1,4-benzoquinone, tetrachloro-1,2-benzoquinone, tetrachloro-1,4-benzoquinone, tetracyano-1,4-benzoquinone, sulfuric acid, fuming sulfuric acid, sulfur trioxide, chlorosulfuric acid, fluorosulfuric acid, amidosulfuric acid, persulfuric acid, ammonium persulfate, sodium persulfate, hydrogen peroxide, and a combination of the multiple oxidizing agents thereof.

In the present invention, a polymerization can be performed without using these oxidizing-agent catalysts. That is, in the present invention, the polymerization is performed in the presence of the Compound (B) having sulfo group having a catalytic ability, or a compound having a substituent having a catalytic ability (sulfo group) is polymerized and therefore the purification process after the reaction, which process is required in the case of using an oxidizing agent, can be skipped.

[Production Method]

The production method of the conductive polymer of the present invention is at least one of the above-described methods (i) to (iii). It is also possible to perform polymerization by combining the conditions of these methods appropriately.

There is no particular limit on the order or the embodiment of addition of the compound selected from the above-described Compound (A1), the Compound (A2) and the Compound (B) having sulfo group depending on the method; and the solvent (C), the Compound (D) copolymerizable with the Compounds (A1) and (A2), and the additives as an optional component, to the reaction system. For example, in addition to the method of adding each of compounds to the reaction container and mixing them, it is also possible to perform polymerization by impregnating a substrate with each of the compounds or applying each of compounds to a substrate in order.

The temperature at the time of polymerization as described above is not particularly limited and preferably 10 to 300° C., more preferably 20 to 180° C., still more preferably 60 to 180° C. When the temperature at the time of polymerization is 10 to 300° C., the reaction rate, the conversion and the viscosity are appropriate and the side reaction can be suppressed. As a result, the conductive polymer can be manufactured stably and in an industrially appropriate time period. In addition, the conductivity of the obtained conductive polymer tends to be increased. The temperature at the time of polymerization can be controlled by using a known heater or an air-conditioner. As needed, the polymerization may be performed while changing the temperature within the above-described range. In the case of evaporating a solvent, the solvent may be evaporated at the polymerization temperature or lower. After evaporating the solvent under reduced pressure or by dry airflow, the temperature may be raised to the polymerization temperature.

There is no particular limit on the atmosphere in the above-described polymerization. The polymerization may be performed in the air, or under an inert gas atmosphere such as nitrogen and argon. The reaction pressure is not particularly limited, but normal pressure is preferred.

The reaction time is not particularly limited. Although the time cannot be uniformly defined since it varies depending on the chemical structure of the compounds, the reaction temperature, the reaction pressure and the like, it is preferably 0.01 to 240 hours, more preferably 0.1 to 72 hours, still more preferably 0.1 to 24 hours.

The pH at the time of reaction is preferably 1 to 7, more preferably 1 to 5, still more preferably 1 to 3. When the pH is 1 or more, the load on the substrate is low. When the pH is 7 or less, the conversion and the reaction rate are appropriate.

In the production method of the conductive polymer of the present invention, it is desirable to develop reaction while removing by-products from the reaction system. The by-products can be removed by a volatility (distillation) method, an adsorption method, and the other separation methods. For example, when the $X^1$ and $X^2$ in the formula (1) or (2) is a compound in which S=O or Se=O, water is generated as a by-product. When the reaction proceeds while removing the water by distillation, the polymerization rate increases and the conversion increases as well. From the viewpoint of retaining the reaction system uniformly, a solvent having a higher boiling point than water may be used.

After the production of a conductive polymer, a solution in the case where the solvent (C) is contained or a solid in the case where the solvent (C) is not contained is obtained, respectively. If the purification is performed, the conductive polymer may be washed by dissolving it in an arbitrary solvent. However, a high conductivity can be obtained without performing the purification process. If the conductive polymer is collected as it is in a solution, the solution may be diluted with an arbitrary solvent, ultrafiltration or the like may be performed to remove the residual monomer, or ultrasonic treatment may be conducted to control the particle diameter and the aggregation structure. When the conductive polymer is obtained as a solid, the obtained substrate may be used as is or may be processed. Otherwise, after the solid is added to a solvent, the resultant is subjected to dispersing treatment and may be used as a dispersion.

When the Solvent (C) is contained, the properties of the conductive polymer after water is vaporized depending on the degree of water-miscibility of the Solvent (C). If the solvent is miscible with water, the reaction proceeds uniformly and a uniform film is generated when all the solvent is vaporized. In contrast, when a solvent that is immiscible with water is used, a conductive polymer is generated in particles at the time when water is vaporized.

The product can be easily confirmed by using a UV spectrum. As the polymerization proceeds, the absorption maximum shifts to a long-wavelength side in a wavelength range of around 300 to 800 nm. Also, when the product is doped with sulfonic acid, wavelength absorption increases in a long-wavelength range of around 1,000 nm or more.

[Method for Storing the Solution Prior to Polymerization]

The storage temperature of the above-mentioned solution prior to polymerization is not particularly limited. The temperature is generally −30 to 50° C., preferably −20 to 40° C., more preferably −10 to 30° C. When the storage temperature of the solution is set to be within the above-mentioned range, it is possible to slow the rate of polymerization that proceeds due to the effect of strong acid. The storage atmosphere is not particularly limited, and it may be the air, or an inert gas atmosphere such as nitrogen and argon. Among these, nitrogen and argon are preferable.

In the case where the monomer solution, the dopant, and the catalytic solution are separated and mixed at the time of polymerization to be used, the temperature range is not limited thereto and the solution can be stored stably in a broader temperature range.

[Conductive Polymer Obtained by the Method of the Present Invention]

The conductive polymer obtained by the method of the present invention is a homopolymer or a copolymer having a substituent having a dopant ability and a catalytic ability (sulfo group) represented by formula (1). The structure of the polymer to be obtained is too complicated to be indicated by a formula (structure) as it stands. Thus, if a structure is not specified, it is not easy to know the properties of the substance determined by a structure. When multiple different monomers are to be reacted, the properties of the polymer composition to be obtained greatly vary depending on the blending ratio of the monomers and the reaction conditions, and therefore it is also impossible to identify the polymer by its properties. Accordingly, the conductive polymer of the present invention (instant claims) is defined by a production method.

EXAMPLES

Hereinafter, the present invention is described in more detail by way of examples as below. It should be noted that these examples are merely for illustrative purposes, and the present invention is not limited thereto.

[Materials]

TABLE 1

| | Name | Manufacturing company |
|---|---|---|
| (A1) | benzo[c]thiophene-1,3-dihydro-2-oxide | Synthesized in-house |
| (A2) | benzo[c]thiophene-1,3-dihydro-2-oxide-5-sulfonic acid | Synthesized in-house |
| (B) | p-toluenesulfonic acid | Obtained by subjecting the sodium salt in (D) to ion-exchange |
| | β-toluenesulfonic acid | Obtained by subjecting sodium salt purchased from Tokyo Chemical Industry Co., Ltd. to ion-exchange |
| | polystyrene sulfonic acid | Purchased from Tokyo Chemical Industry Co., Ltd. |
| (D) | 1,3-dihydroisothianaphthene | Synthesized in-house |
| | Sodium 1,3-dihydroisothianaphthene-5-sulfonate | Synthesized in-house |
| | sodium p-toluenesulfonate | Purchased from Tokyo Chemical Industry Co., Ltd. |

Example 1: Solubility Test

Benzo[c]thiophene-1,3-dihydro-2-oxide was dissolved a little at a time in 10 g of a solvent, and the amount of dissolution was visually inspected. The dissolution amount was evaluated as follows: 5 mass % or more is ranked as "soluble", 0.5 to 5 mass % as "slightly soluble", less than 0.5 mass % or less as "insoluble". The results are shown in Table 2.

Comparative Example 1: Solubility Test 1,3-dihydroisothianaphthene was dissolved a little at a time in 10 g of a solvent. Evaluation was conducted in the same way as in Example 1, and the results are shown in Table 2.

TABLE 2

| Solvent | Example 1 | Comparative Example 1 |
|---|---|---|
| Water | Soluble | Insoluble |
| Ethylene glycol | Soluble | Insoluble |
| Methanol | Soluble | Slightly soluble |
| Ethanol | Soluble | Soluble |
| Isopropanol | Soluble | Soluble |
| Dimethyl sulfoxide | Soluble | Soluble |
| Dimethyl formamide | Soluble | Soluble |

Example 2: Stability Test after Dissolution 1.0 g of benzo[c]thiophene-1,3-dihydro-2-oxide and 0.25 g of p-toluenesulfonic acid-hydrate (pTSA, molar ratio: 5/1) were dissolved in 11.0 g of each solvent (solid content: 10 mass %) in composition as shown in Table 3 in the air. The solution was visually observed immediately (early period), 24 hours, and one week after the dissolution. The results are shown in Table 3.

TABLE 3

| Temperature | Solvent | Catalyst | Early phase | After 24 hours | After 1 week |
|---|---|---|---|---|---|
| 25° C. | None | None | Colorless and transparent | Colorless and transparent | Colorless and transparent |
| 25° C. | Water | pTSA | Colorless and transparent | Colorless and transparent | Colorless and transparent |
| 25° C. | DMSO | pTSA | Colorless and transparent | Colorless and transparent | Colorless and transparent |
| 4° C. | DMSO | pTSA | Colorless and transparent | Colorless and transparent | Colorless and transparent |
| 25° C. | EtOH | pTSA | Colorless and transparent | Colorless and transparent | Colorless and transparent |

DMSO: dimethyl sulfoxide,
EtOH: ethanol,
pTSA: p-toluenesulfonic acid

Comparative Example 2: Stability Test after Dissolution 1.0 g of 1,3-dihydroisothianaphthene and 0.28 g of p-toluenesulfonic acid-hydrate (pTSA, molar ratio: 5/1) were dissolved in 11.3 g of each solvent (solid content: 10 mass %) in composition as shown in Table 4 in the air. The solution was visually observed immediately (early period), 24 hours, and one week after the dissolution. The results are shown in Table 4.

TABLE 4

| Temperature | Solvent | Catalyst | Early phase | After 24 hours | After 1 week |
|---|---|---|---|---|---|
| 25° C. | None | None | Colorless and transparent | Pale yellow | Pale brown |
| 25° C. | DMSO | pTSA | Colorless and transparent | Pale brown | Deep blue |
| 4° C. | DMSO | pTSA | Colorless and transparent | Pale yellow | Pale yellow |
| 25° C. | EtOH | pTSA | Colorless and transparent | Brownish red | Deep blue |

DMSO: dimethyl sulfoxide,
EtOH: ethanol,
pTSA: p-toluenesulfonic acid

<Polymerization of Method (i)>

Example 3: Polymerization of benzo[c]thiophene-1,3-dihydro-2-oxide in Presence of p-toluenesulfonic Acid 1.64 mmol (250 mg) of benzo[c]thiophene-1,3-dihydro-2-oxide was dissolved in 9.44 of ion-exchanged water, and 1.64 mmol (312 mg) of p-toluenesulfonic acid-hydrate was added thereto to prepare an aqueous solution. Then, a part of the prepared aqueous solution was delivered by drops onto a glass plate, followed by heating and drying at 150° C. for 1 hour. The generated solid was black. The product was added to water and a UV spectrum was measured at room temperature. Absorption was observed in a long wavelength region around 700 nm to 1300 nm and the generation of polyisothianaphthene was confirmed.

Comparative Example 3: Polymerization of Benzo[c]Thiophene-1,3-Dihydro-2-Oxide in Presence of Sodium p-Toluenesulfonate 1.64 mmol (250 mg) of benzo[c]thiophene-1,3-dihydro-2-oxide was dissolved in 9.44 of ion-exchanged water, and 1.64 mmol (315 mg) of sodium p-toluenesulfonate was added thereto to prepare an aqueous solution. Then, a part of the prepared aqueous solution was delivered by drops onto a glass plate, followed by heating and drying at 150° C. for 1 hour. The generated solid was white, and the progress of polymerization was not confirmed.

Example 4: Polymerization of benzo[c]thiophene-1,3-dihydro-2-oxide in Presence of p-Toluenesulfonic Acid (in Ethanol)

6.57 mmol (1.0 g) of benzo[c]thiophene-1,3-dihydro-2-oxide and 1.31 mmol (0.25 g) of p-toluenesulfonic acid-hydrate were dissolved in 11.0 g of ethanol to prepare a solution having a solid content of 10 mass %.

The prepared solution was relatively stable, and remained colorless and transparent after being left to stand in the air at room temperature for 1 week. A part of the prepared aqueous solution was delivered by drops onto a glass plate, followed by heating and drying at 120° C. for 1 hour. The generated solid was black. The generation of polyisothianaphthene was confirmed from the measurement of the UV spectrum obtained by adding the product to water.

After heating the solution in dry air at a temperature increase rate of 5° C./min. to 40° C. in TG-DTA (Thermo Plus TG-8120, manufactured by Rigaku Corporation), the solution was kept at a constant temperature for 2 hours so that ethanol is sufficiently volatilized, and again heated at a temperature increase rate of 5° C./min. to 250° C. to confirm the reaction behavior.

The obtained TG-DTA curve is shown in FIG. 1.

Comparative Example 4: Polymerization of 1,3-dihydroisothianaphthene in Presence of p-toluenesulfonic Acid (Comparison with Example 4)

7.34 mmol (1.0 g) of 1,3-dihydroisothianaphthene and 1.47 mmol (0.28 g) of p-toluenesulfonic acid-hydrate were dissolved in 11.3 g of ethanol to prepare a solution having a solid content of 10 mass %.

The prepared solution immediately turned to yellow after the preparation, and resulted in a black precipitate after a few hours. A part of the prepared solution was delivered by drops onto a glass plate, followed by heating and drying at 120° C. for 1 hour. The generated solid was black. The generation of polyisothianaphthene was confirmed from the measurement of the UV spectrum obtained by adding the product to water.

The TG-DTA measurement was conducted under the same conditions as in Example 4. The obtained TG-DTA curve is shown in FIG. 2.

Example 5: Polymerization of benzo[c]thiophene-1,3-dihydro-2-oxide in Presence of β-naphthalenesulfonic Acid 3.30 mmol (755 mg) of β-naphthalenesulfonic acid was dissolved in 18.75 g of water to be subjected to ion exchange by using a cation exchange resin. 1.64 mmol (250 mg) of benzo[c]thiophene-1,3-dihydro-2-oxide was added to 9.75 g of the obtained aqueous solution of 3-naphthalenesulfonic acid (1.64 mmol of β-naphthalenesulfonic acid in the aqueous solution) to prepare an aqueous solution. The prepared aqueous solution was dried at 110° C. for 1 hour on a hot plate. The formed film was blue and the generation of polyisothianaphthene was confirmed from the measurement of the UV spectrum obtained by adding the product to water.

Example 6: Polymerization of benzo[c]thiophene-1,3-dihydro-2-oxide in Presence of Polystyrene Sulfonic Acid 3.29 mmol (500 mg) of benzo[c]thiophene-1,3-dihydro-2-oxide was dissolved in 14.8 g of ion-exchanged water, and 5.95 g (6.82 mmol in terms of sulfo group) of an aqueous solution of 21 mass % of polystyrene sulfonic acid, which was prepared from sodium salt by the ion-exchange, was added thereto to thereby prepare an aqueous solution. Then, part of the prepared aqueous solution was delivered by drops onto a glass plate, heated and dried at 120° C. for 1 hour. The generated solid was black, and the generation of polyisothianaphthene was confirmed from the measurement of the UV spectrum obtained by adding the product to water.

Example 7: Production of Dispersion of Composite of benzo[c]thiophene-1,3-dihydro-2-oxide and Polystyrene Sulfonic Acid in Ethylene Glycol 0.736 mmol (112 mg) of benzo[c]thiophene-1,3-dihydro-2-oxide was dissolved in 3.31 g of ion-exchanged water, and 1.33 g (1.52 mmol in terms of sulfo group) of an aqueous solution of 21 mass % of polystyrene sulfonic acid, which was prepared from sodium salt by the ion-exchange, and 12.6 g of ethylene glycol were added thereto. By heating the prepared liquid at 105° C. for 4 hours, a deep blue liquid was obtained. The generation of polyisothianaphthene was confirmed from the measurement of the UV spectrum obtained by adding the obtained liquid to water.

<Polymerization of Method (ii)>

Example 8: Homopolymerization of benzo[c]thiophene-1,3-dihydro-2-oxide-5-sulfonic Acid 94.4 mmol (24.0 g) of sodium benzo[c]thiophene-1,3-dihydro-2-oxide-5-sulfonate was added to and dissolved in 459.6 g of ion-exchanged water, and allowed to pass through a column filled with cation-exchange resin to thereby remove sodium. Part of the obtained aqueous solution was delivered by drops onto a glass plate, and heated and dried at 120° C. for 1 hour. The generated solid was black and the generation of polyisothianaphthene was confirmed from the measurement of the UV spectrum obtained by adding the obtained liquid to water. The product was water-soluble and 1 g or more thereof was dissolved in 10 ml of water.

The TG-DTA curve measured under the same conditions as in Example 4 is shown in FIG. 3. An apparent reaction peak was observed between 120 to 130° C.

The conductivity of the generated film was measured and found to be 0.014 S/cm.

Comparative Example 5: Polymerization of Sodium benzo[c]thiophene-1,3-dihydro-2-oxide-5-sulfonate 94.4 mmol (24.0 g) of sodium benzo[c]thiophene-1,3-dihydro-2-oxide-5-sulfonate was added to 459.6 g of ion-exchanged water to be dissolved. After heating the obtained solution at 120° C. for 1 hour, a white solid was obtained.

Comparative Example 6: Polymerization of 1,3-dihydroisothianaphthene-5-sulfonic Acid 41.9 mmol (10.0 g) of sodium 1,3-dihydroisothianaphthene-5-sulfonate was added to 80.0 g of ion-exchanged water to be dissolved, and allowed to pass through a column filled with cation-exchange resin to thereby remove sodium. Part of the obtained aqueous solution was delivered by drops onto a glass plate, and heated and dried at 120° C. for 1 hour. The generated solid was black and the generation of polyisothianaphthene was confirmed from the measurement of the UV spectrum obtained by adding the obtained liquid to water.

The TG-DTA curve measured under the same conditions as in Example 4 is shown in FIG. 4.

Example 9: Homopolymerization of benzo[c]thiophene-1,3-dihydro-2-oxide-5-sulfonic Acid (at High Concentration)

94.4 mmol (24.0 g) of sodium benzo[c]thiophene-1,3-dihydro-2-oxide-5-sulfonate was added to and dissolved in 78.3 g of ion-exchanged water, and allowed to pass through a column filled with cation-exchange resin to thereby remove sodium. Part of the obtained aqueous solution was delivered by drops onto a glass plate, and heated and dried at 120° C. for 1 hour. The generated solid was black and the generation of polyisothianaphthene was confirmed from the measurement of the UV spectrum obtained by adding the obtained liquid to water. The product was water-soluble and 1 g or more thereof was dissolved in 10 ml of water.

<Polymerization of Method (iii)>

Example 10: Copolymerization of benzo[c]thiophene-1,3-dihydro-2-oxide-5-sulfonic Acid and benzo[c]thiophene-1,3-dihydro-2-oxide (Molar Ratio of 7:3)

38.1 mmol (5.8 g) of benzo[c]thiophene-1,3-dihydro-2-oxide was dissolved in 94 g of ion-exchanged water to prepare an aqueous solution of benzo[c]thiophene-1,3-dihydro-2-oxide. 10 g of the aqueous solution of benzo[c]thiophene-1,3-dihydro-2-oxide (3.82 mmol of benzo[c]thiophene-1,3-dihydro-2-oxide in the aqueous solution) was mixed with 45.5 g of an aqueous solution of benzo[c]thiophene-1,3-dihydro-2-oxide-5-sulfonic acid (8.91 mmol of benzo[c]thiophene-1,3-dihydro-2-oxide-5-sulfonic acid) prepared in Example 8 to prepare a solution. The molar ratio of the manufactured aqueous solution was confirmed by the NMR analyzed in heavy water ($D_2O$). Part of the obtained aqueous solution was delivered by drops onto a glass plate and heated and dried at 120° C. for 1 hour. The generated solid was black and the generation of polyisothianaphthene was confirmed from the measurement of the UV spectrum obtained by adding the obtained liquid to water. The product was water-insoluble.

The conductivity of the generated film was measured by a conductivity meter manufactured by Mitsubishi Chemical Analytech Co., Ltd. using a PSP probe under the condition of 25° C. and found to be 0.97 S/cm.

Example 11: Copolymerization of benzo[c]thiophene-1,3-dihydro-2-oxide-5-sulfonic Acid and benzo[c]thiophene-1,3-dihydro-2-oxide (Molar Ratio of 5:5)

10 g of the aqueous solution of benzo[c]thiophene-1,3-dihydro-2-oxide (3.82 mmol of benzo[c]thiophene-1,3-dihydro-2-oxide in the aqueous solution) prepared in Example 10 was mixed with 19.5 g of an aqueous solution of benzo[c]thiophene-1,3-dihydro-2-oxide-5-sulfonic acid (3.82 mmol of benzo[c]thiophene-1,3-dihydro-2-oxide-5-sulfonic acid) prepared in Example 8 to prepare a solution. The molar ratio of the manufactured aqueous solution was confirmed by the NMR analyzed in heavy water ($D_2O$). Part of the obtained aqueous solution was delivered by drops onto a glass plate and heated and dried at 120° C. for 1 hour. The generated solid was black and the generation of polyisothianaphthene was confirmed from the measurement of the UV spectrum obtained by adding the obtained liquid to water. The product was water-insoluble.

The conductivity of the generated film was measured by the same way as in Example 10 and found to be 0.98 S/cm.

Example 12: Copolymerization of benzo[c]thiophene-1,3-dihydro-2-oxide-5-sulfonic Acid and benzo[c]thiophene-1,3-dihydro-2-oxide (Molar Ratio of 3:7)

10 g of the aqueous solution of benzo[c]thiophene-1,3-dihydro-2-oxide (3.82 mmol of benzo[c]thiophene-1,3-dihydro-2-oxide in the aqueous solution) prepared in Example 10 was mixed with 8.37 g of an aqueous solution of benzo[c]thiophene-1,3-dihydro-2-oxide-5-sulfonic acid (1.64 mmol of benzo[c]thiophene-1,3-dihydro-2-oxide-5-sulfonic acid) prepared in Example 8 to prepare a solution. The molar ratio of the manufactured aqueous solution was confirmed by the NMR analyzed in heavy water ($D_2O$). Part of the obtained aqueous solution was delivered by drops onto a glass plate and heated and dried at 120° C. for 1 hour. The generated solid was black and the generation of polyisothianaphthene was confirmed from the measurement of the UV spectrum obtained by adding the obtained liquid to water. The product was water-insoluble.

The conductivity of the generated film was measured by the same way as in Example 10 and found to be 0.13 S/cm.

Example 13: Homopolymerization of benzo[c]thiophene-1,3-dihydro-2-oxide-5-sulfonic Acid (Addition of Ethylene Glycol)

A solution was prepared by adding 10 parts by mass of ethylene glycol to the solution prepared in Example 8 (addition of 1.0 g of ethylene glycol to 10 g of the solution of Example 8). Part of the obtained aqueous solution was delivered by drops onto a glass plate, and heated and dried at 120° C. for 1 hour. The generated solid was black and the generation of polyisothianaphthene was confirmed from the measurement of the UV spectrum obtained by adding the obtained liquid to water. The product is water-soluble and it is possible to wash it away with water after the formation of a film and to prepare an aqueous solution of the product.

The conductivity of the generated film was measured by the same way as in Example 10 and found to be 0.35 S/cm.

Example 14: Copolymerization of benzo[c]thio-
phene-1,3-dihydro-2-oxide-5-sulfonic Acid and
benzo[c]thiophene-1,3-dihydro-2-oxide (Molar
Ratio of 7:3, Addition of Ethylene Glycol)

A solution was prepared by adding 10 parts by mass of ethylene glycol to the mixed liquid of two compounds prepared in Example 10 (addition of 1.0 g of ethylene glycol to 10 g of the mixed liquid of Example 10). Part of the obtained aqueous solution was delivered by drops onto a glass plate and heated and dried at 120° C. for 1 hour. The generated solid was black and the generation of polyisothianaphthene was confirmed from the measurement of the UV spectrum obtained by adding the obtained liquid to water. The product was water-insoluble.

The conductivity of the generated film was measured by the same way as in Example 10 and found to be 0.43 S/cm.

Example 15: Copolymerization of benzo[c]thio-
phene-1,3-dihydro-2-oxide-5-sulfonic Acid and
benzo[c]thiophene-1,3-dihydro-2-oxide (Molar
Ratio of 5:5, Addition of Ethylene Glycol)

A solution was prepared by adding 10 parts by mass of ethylene glycol to the mixed liquid of two compounds prepared in Example 11 (addition of 1.0 g of ethylene glycol to 10 g of the mixed liquid of Example 11). Part of the obtained aqueous solution was delivered by drops onto a glass plate and heated and dried at 120° C. for 1 hour. The generated solid was black and the generation of polyisothianaphthene was confirmed from the measurement of the UV spectrum obtained by adding the obtained liquid to water. The product was water-insoluble.

The conductivity of the generated film was measured by the same way as in Example 10 and found to be 2.4 S/cm.

Example 16: Copolymerization of benzo[c]thio-
phene-1,3-dihydro-2-oxide-5-sulfonic Acid and
benzo[c]thiophene-1,3-dihydro-2-oxide (Molar
Ratio of 3:7, Addition of Ethylene Glycol)

A solution was prepared by adding 10 parts by mass of ethylene glycol to the mixed liquid of two compounds prepared in Example 12 (addition of 1.0 g of ethylene glycol to 10 g of the mixed liquid of Example 12). Part of the obtained aqueous solution was delivered by drops onto a glass plate and heated and dried at 120° C. for 1 hour. The generated solid was black and the generation of polyisothianaphthene was confirmed from the measurement of the UV spectrum obtained by adding the obtained liquid to water. The product was water-insoluble.

The conductivity of the generated film was measured by the same way as in Example 10 and found to be 9.4 S/cm.

Example 17: Production of Dispersion of Copoly-
mer of benzo[c]thiophene-1,3-dihydro-2-oxide-5-
sulfonic Acid and benzo[c]thiophene-1,3-dihydro-2-
oxide in Ethylene Glycol 4.1 g of the mixed liquid of two compounds prepared in Example 11 (molar ratio between benzo[c]thiophene-1,3-dihydro-2-oxide-5-sulfonic acid and benzo[c]thiophene-1,3-dihydro-2-oxide is 5:5) was added to 6.7 g of ethylene glycol and mixed. By heating the prepared liquid at 105° C. for 4 hours, a deep blue liquid was obtained. The generation of polyisothianaphthene was confirmed from the measurement of the UV spectrum obtained by adding the obtained liquid to water.

Part of the obtained dispersion was delivered by drops onto a glass plate and heated and dried at 120° C. for 1 hour. The conductivity of the generated film was measured and found to be 3.0 S/cm.

Example 18: Production of Dispersion of Copoly-
mer of benzo[c]thiophene-1,3-dihydro-2-oxide-5-
sulfonic Acid and benzo[c]thiophene-1,3-dihydro-2-
oxide in Dimethyl Sulfoxide 5.1 g of the mixed liquid of two compounds prepared in Example 11 (molar ratio between benzo[c]thiophene-1,3-dihydro-2-oxide-5-sulfonic acid and benzo[c]thiophene-1,3-dihydro-2-oxide is 5:5) was added to 8.1 g of dimethyl sulfoxide and mixed. By heating the prepared liquid at 120° C. for 6 hours, a deep blue liquid was obtained. The generation of polyisothianaphthene was confirmed from the measurement of the UV spectrum obtained by adding the obtained liquid to water.

Examples 1 and 2 and Comparative Examples 1 and 2 reveal that benzo[c]thiophene-1,3-dihydro-2-oxide as being the compound (A1) can be dissolved in a wider range of polar solvents compared to 1,3-dihydroisothianaphthene, and the solution after dissolution is stable. In FIG. 1 and FIG. 3, the reaction heat can be confirmed more apparently compared to FIG. 2 and FIG. 4. Thus, FIGS. 1 and 2 indicate good reactivity of the examples.

Examples 3 to 18 reveal that it is possible to manufacture various conductive polymers by the methods (i) to (iii).

INDUSTRIAL APPLICABILITY

The present invention provides a method to facilitate the production process of conductive polymers and applications to an antistatic agent, a solid electrolyte for a capacitor, an electro conductive coating, an electrochromic device, an electrode material, a thermoelectric conversion material, a transparent conductive film, a chemical sensor, an actuator and the like may be available.

The invention claimed is:
1. A method of producing a polyisothianaphthene-based conductive polymer, comprising polymerizing at least one compound (A1) represented by formula (1) in the presence of a compound (B) having a sulfo group

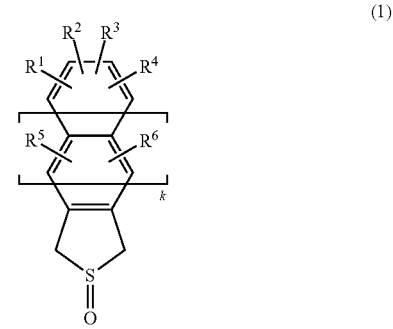

(1)

wherein the compound (B) is at least one selected from a group consisting of alkyl sulfonic acid, benzene sulfonic acid, naphthalene sulfonic acid, anthraquinone sulfonic acid, camphor sulfonic acid, and a derivative thereof; and polyvinyl sulfonic acid, polystyrene sulfonic acid, polyallyl sulfonic acid, polyethyl acrylate sulfonic acid, polybutyl acrylate sulfonic acid, poly(2-acrylamido-2-methylpropane sulfonic acid), and polyisoprene sulfonic acid;

in the formula, $R^1$, $R^2$, $R^3$, $R^4$, $R^5$, and $R^6$ independently represent a monovalent substituent selected from a group consisting of (1) a hydrogen atom, (2) linear or branched alkyl group having 1 to 20 carbon atoms, linear or branched alkoxy group having 1 to 20 carbon atoms, or linear or branched alkyl ester group (alkylcarbonyloxy group or alkoxycarbonyl group) having 1 to 20 carbon atoms, (3) $SO_2M$, (4) a halogen atom, (5) carboxy group, (6) phosphonyl group, (7) nitro group, (8) cyano group, (9) primary, secondary or tertiary amino group, (10) trihalomethyl group, (11) phenyl group, and (12) phenyl group substituted with at least one member selected from alkyl group, hydroxy group, alkoxy group, alkyl ester group, carbonyl group and a halogen atom; hydrocarbon chains in the substituent represented by $R^1$, $R^2$, $R^3$, $R^4$, $R^5$, and $R^6$ are bound to one another at an arbitrary position and may form at least one bivalent chain that forms at least one three- to seven-membered ring structure of saturated or unsaturated hydrocarbon chain with the carbon atoms to which the substituent is bound; the alkyl group, alkoxy group, or alkyl ester group represented by $R^1$, $R^2$, $R^3$, $R^4$, $R^5$, and $R^6$, or a cyclic hydrocarbon chain constituted thereof may contain at least one bond selected from a carbonyl bond, an ether bond, an ester bond, an amide bond, a sulfide bond, a sulfinyl bond, sulphonyl bond, and an imino bond; M represents OH; alkali metal alkoxide selected from $O^-Na^+$, $O^-Li^+$, and $O^-K^+$; ammonium alkoxyde represented by $O^-NH_4^+$; linear or branched alkoxy group having 1 to 20 carbon atoms; or a halogen atom selected from chloride, fluorine, bromine, and iodine; k represents the number of condensed rings surrounded by a hetero ring and a benzene ring having substituents of $R^1$ to $R^4$, which is an integer from 0 to 3, wherein the polymerization is performed without using an oxidizing agent.

2. The method of producing the polyisothianaphthene-based conductive polymer according to claim 1, wherein the compound (A1) is a compound in which k in the formula (1) is 0.

3. The method of producing the polyisothianaphthene-based conductive polymer according to claim 1, wherein $R^1$, $R^2$, $R^3$, $R^4$, $R^5$, and $R^6$ in the formula (1) independently is a monovalent substituent selected from (1) a hydrogen atom, (2) linear or branched alkyl group having 1 to 20 carbon atoms, linear or branched alkoxy group having 1 to 20 carbon atoms, or linear or branched alkyl ester group having 1 to 20 carbon atoms, and (3) a halogen atom.

4. A method of producing a polyisothianaphthene-based conductive polymer, comprising polymerizing at least one compound (A2) represented by formula (2)

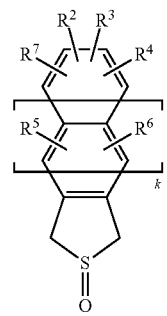

in the formula, $R^7$ is sulfo group; $R^2$, $R^3$, $R^4$, $R^5$, and $R^6$ independently represent a monovalent substituent selected from a group consisting of (1) a hydrogen atom, (2) linear or branched alkyl group having 1 to 20 carbon atoms, linear or branched alkoxy group having 1 to 20 carbon atoms, or linear or branched alkyl ester group (alkylcarbonyloxy group or alkoxycarbonyl group) having 1 to 20 carbon atoms, (3) $SO_2M$, (4) a halogen atom, (5) carboxy group, (6) phosphonyl group, (7) nitro group, (8) cyano group, (9) primary, secondary or tertiary amino group, (10) trihalomethyl group, (11) phenyl group, and (12) phenyl group substituted with at least one member selected from alkyl group, hydroxy group, alkoxy group, alkyl ester group, carbonyl group, sulfo group and a halogen atom; hydrocarbon chains in the substituent represented by $R^2$, $R^3$, $R^4$, $R^5$, and $R^6$ are bound to one another at an arbitrary position and may form at least one bivalent chain that forms at least one three- to seven-membered ring structure of saturated or unsaturated hydrocarbon chain with the carbon atoms to which the substituent is bound; the alkyl group, alkoxy group, or alkyl ester group represented by $R^2$, $R^3$, $R^4$, $R^5$, and $R^6$, or a cyclic hydrocarbon chain constituted thereof may contain at least one bond selected from a carbonyl bond, an ether bond, an ester bond, an amide bond, a sulfide bond, a sulfinyl bond, sulphonyl bond, and an imino bond; M represents OH; alkali metal alkoxide selected from $O^-Na^+$, $O^-Li^+$, and $O^-K^+$; ammonium alkoxyde represented by $O^-NH_4^+$; linear or branched alkoxy group having 1 to 20 carbon atoms; or a halogen atom selected from chloride, fluorine, bromine, and iodine; k represents the number of condensed rings surrounded by a hetero ring and a benzene ring having substituents of $R^2$ to $R^4$, which is an integer from 0 to 3.

5. The method of producing the polyisothianaphthene-based conductive polymer according to claim 4, wherein the compound (A2) is a compound in which k in the formula (2) is 0.

6. The method of producing the polyisothianaphthene-based conductive polymer according to claim 4, wherein $R^2$, $R^3$, $R^4$, $R^5$, and $R^6$ in the formula (2) independently is a monovalent substituent selected from (1) a hydrogen atom, (2) linear or branched alkyl group having 1 to 20 carbon atoms, linear or branched alkoxy group having 1 to 20 carbon atoms, or linear or branched alkyl ester group having 1 to 20 carbon atoms, and (3) a halogen atom.

7. A method of producing a polyisothianaphthene-based conductive polymer, comprising copolymerizing at least one of compounds (A1) represented by formula (1) and at least one of compounds (A2) represented by formula (2);

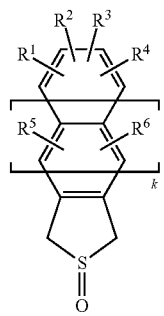

(1)

in the formula, $R^1$, $R^2$, $R^3$, $R^4$, $R^5$, and $R^6$ independently represent a monovalent substituent selected from a group consisting of (1) a hydrogen atom, (2) linear or branched alkyl group having 1 to 20 carbon atoms, linear or branched alkoxy group having 1 to 20 carbon atoms, or linear or branched alkyl ester group (alkylcarbonyloxy group or alkoxycarbonyl group) having 1 to 20 carbon atoms, (3) $SO_2M$, (4) a halogen atom, (5) carboxy group, (6) phosphonyl group, (7) nitro group, (8) cyano group, (9) primary, secondary or tertiary amino group, (10) trihalomethyl group, (11) phenyl group, and (12) phenyl group substituted with at least one member selected from alkyl group, hydroxy group, alkoxy group, alkyl ester group, carbonyl group and a halogen atom; hydrocarbon chains in the substituent represented by $R^1$, $R^2$, $R^3$, $R^4$, $R^5$, and $R^6$ are bound to one another at an arbitrary position and may form at least one bivalent chain that forms at least one three- to seven-membered ring structure of saturated or unsaturated hydrocarbon chain with the carbon atoms to which the substituent is bound; the alkyl group, alkoxy group, or alkyl ester group represented by $R^1$, $R^2$, $R^3$, $R^4$, $R^5$, and $R^6$, or a cyclic hydrocarbon chain constituted thereof may contain at least one bond selected from a carbonyl bond, an ether bond, an ester bond, an amide bond, a sulfide bond, a sulfinyl bond, sulphonyl bond, and an imino bond; M represents OH; alkali metal alkoxide selected from $O^-Na^+$, $O^-Li^+$, and $O^-K^+$; ammonium alkoxyde represented by $O^-NH_4^+$; linear or branched alkoxy group having 1 to 20 carbon atoms; or a halogen atom selected from chloride, fluorine, bromine, and iodine; k represents the number of condensed rings surrounded by a hetero ring and a benzene ring having substituents of $R^1$ to $R^4$, which is an integer from 0 to 3;

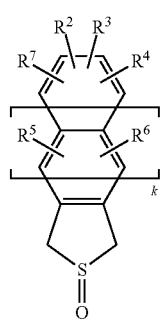

(2)

in the formula, $R^7$ is sulfo group; $R^2$, $R^3$, $R^4$, $R^5$, and $R^6$ independently represent a monovalent substituent selected from a group consisting of (1) a hydrogen atom, (2) linear or branched alkyl group having 1 to 20 carbon atoms, linear or branched alkoxy group having 1 to 20 carbon atoms, or linear or branched alkyl ester group (alkylcarbonyloxy group or alkoxycarbonyl group) having 1 to 20 carbon atoms, (3) $SO_2M$, (4) a halogen atom, (5) carboxy group, (6) phosphonyl group, (7) nitro group, (8) cyano group, (9) primary, secondary or tertiary amino group, (10) trihalomethyl group, (11) phenyl group, and (12) phenyl group substituted with at least one member selected from alkyl group, hydroxy group, alkoxy group, alkyl ester group, carbonyl group, sulfo group and a halogen atom; hydrocarbon chains in the substituent represented by $R^2$, $R^3$, $R^4$, $R^5$, and $R^6$ are bound to one another at an arbitrary position and may form at least one bivalent chain that forms at least one three- to seven-membered ring structure of saturated or unsaturated hydrocarbon chain with the carbon atoms to which the substituent is bound; the alkyl group, alkoxy group, or alkyl ester group represented by $R^2$, $R^3$, $R^4$, $R^5$, and $R^6$, or a cyclic hydrocarbon chain constituted thereof may contain at least one bond selected from a carbonyl bond, an ether bond, an ester bond, an amide bond, a sulfide bond, a sulfinyl bond, sulphonyl bond, and an imino bond; M represents OH; alkali metal alkoxide selected from $O^-Na^+$, $O^-Li^+$, and $O^-K^+$; ammonium alkoxyde represented by $O^-NH_4^+$; linear or branched alkoxy group having 1 to 20 carbon atoms; or a halogen atom selected from chloride, fluorine, bromine, and iodine; k represents the number of condensed rings surrounded by a hetero ring and a benzene ring having substituents of $R^2$ to $R^4$, which is an integer from 0 to 3.

8. The method of producing a polyisothianaphthene-based conductive polymer according to claim 1, comprising copolymerizing compound (D), which can be copolymerized with the compound (A1), and at least one of the compounds (A1) in the presence of a compound (B) having sulfo group.

9. The method of producing a polyisothianaphthene-based conductive polymer according to claim 4, comprising copolymerizing compound (D), which can be copolymerized with the compound (A2), and at least one of the compounds (A2).

10. The method of producing a polyisothianaphthene-based conductive polymer according to claim 7, comprising copolymerizing compound (D), which can be copolymerized with the compound (A1) and the compound (A2), at least one of the compounds (A1), and at least one of the compounds (A2).

11. The method of producing the polyisothianaphthene-based conductive polymer according to claim 1, wherein the polymerization is performed while removing the generated water.

12. The method of producing the polyisothianaphthene-based conductive polymer according to claim 1, wherein the polymerization is conducted in a solvent and a part or a whole of the solvent is a solvent having a boiling point higher than water.

* * * * *